US012681232B2

(12) United States Patent　　　　(10) Patent No.:　US 12,681,232 B2

Glik et al.　　　　　　　　　　　　(45) Date of Patent:　　　Jul. 14, 2026

(54) HYBRID CAST AND MOLD FOR A WAVEGUIDE OPTICAL COMBINER WITH DIMINISHED SINK MARKS AND IMPROVED ASPECT RATIO

(71) Applicant: GOOGLE LLC, Mountain View, CA (US)

(72) Inventors: Eliezer Glik, San Diego, CA (US); Bernard C. Kress, Redwood City, CA (US); Kang Luo, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 241 days.

(21) Appl. No.: 18/441,315

(22) Filed: Feb. 14, 2024

(65) Prior Publication Data

US 2025/0258330 A1　　Aug. 14, 2025

(51) Int. Cl.
F21V 8/00　　　　　(2006.01)
B29D 11/00　　　　(2006.01)

(52) U.S. Cl.
CPC ........ G02B 6/0065 (2013.01); B29D 11/0074 (2013.01); B29D 11/00865 (2013.01)

(58) Field of Classification Search
CPC ........................... G02B 6/0065; G02B 5/1852; G02B 27/0081; G02B 27/0172; G02B 2027/0178; B29D 11/0074; B29D 11/00865; B29D 11/00663
See application file for complete search history.

(56) References Cited

U.S. PATENT DOCUMENTS

| | | | | |
|---|---|---|---|---|
| 10,267,970 | B2 * | 4/2019 | Jones, Jr. ............. | G02B 6/0016 |
| 10,444,419 | B2 * | 10/2019 | Bhargava ............. | G02B 6/0016 |
| 10,481,317 | B2 * | 11/2019 | Peroz ................... | G02B 6/0016 |
| 10,627,559 | B2 * | 4/2020 | Curtis ................. | G02B 6/0016 |
| 10,725,223 | B2 * | 7/2020 | Schowengerdt ..... | G02B 6/0016 |
| 10,823,894 | B2 * | 11/2020 | Peroz ................... | G02B 6/0016 |
| 10,983,263 | B2 * | 4/2021 | Kleinman ........... | G02B 6/0016 |
| 11,428,859 | B2 * | 8/2022 | Curtis ................. | G02B 6/0016 |
| 11,604,310 | B2 * | 3/2023 | Schowengerdt ..... | G02B 6/0016 |
| 11,822,112 | B2 * | 11/2023 | Curtis ................. | G02B 6/0016 |
| 12,164,134 | B2 * | 12/2024 | Curtis ................. | G02B 6/0016 |
| 12,298,550 | B2 * | 5/2025 | Schowengerdt ..... | G02B 6/0016 |
| 2016/0334562 | A1 | 11/2016 | Richards et al. | |
| 2018/0052276 | A1 * | 2/2018 | Klienman ........... | G02B 6/0016 |
| 2018/0052277 | A1 * | 2/2018 | Schowengerdt ..... | G02B 6/0016 |
| 2018/0052320 | A1 * | 2/2018 | Curtis ................. | G02B 6/0016 |
| 2018/0052501 | A1 * | 2/2018 | Jones, Jr. ............. | G02B 6/0016 |

(Continued)

FOREIGN PATENT DOCUMENTS

JP　　　　2004294720 A　　10/2004

*Primary Examiner* — Andrew Jordan

(57) ABSTRACT

An optical component includes a waveguide combiner that has one or more optical components composed of a polymer and at least partially formed via a first casting process, a transparent body formed via a second casting process, the transparent body composed of a polymer and having a first working surface and an opposing second working surface. One or more optical components are disposed at a first surface of the transparent body. A thin film layer is disposed at least partially on one of the one or more optical components. A first layer of resin material overlays the one or more optical components and the first working surface of the transparent body.

19 Claims, 6 Drawing Sheets

(56) References Cited

U.S. PATENT DOCUMENTS

| | | | |
|---|---|---|---|
| 2018/0059297 A1* | 3/2018 | Peroz ................... | G02B 6/0016 |
| 2018/0059304 A1* | 3/2018 | Bhargava ............. | G02B 6/0016 |
| 2019/0278086 A1 | 9/2019 | Ofir | |
| 2020/0041712 A1* | 2/2020 | Peroz ................... | G02B 6/0016 |
| 2020/0209459 A1* | 7/2020 | Curtis ................. | G02B 6/0016 |
| 2020/0284967 A1* | 9/2020 | Schowengerdt ..... | G02B 6/0016 |
| 2022/0381969 A1* | 12/2022 | Curtis ................. | G02B 6/0016 |
| 2023/0129889 A1* | 4/2023 | Schowendgerdt ... | G02B 6/0016 |
| | | | 359/566 |
| 2024/0012190 A1* | 1/2024 | Curtis ................. | G02B 6/0016 |
| 2025/0067919 A1* | 2/2025 | Curtis ................. | G02B 6/0016 |
| 2025/0258330 A1* | 8/2025 | Glik ................... | G02B 5/1852 |

* cited by examiner

100

105 — FABRICATE AND COMPRESS INJECTION MOLDS TOGETHER AND FORM A FACETED WAVEGUIDE WORKPIECE 104 102

110 — RELEASE THE FACETED WAVEGUIDE WORKPIECE FROM THE MOLD 104
106

115 — DISPOSE AN OPTICAL COATING FOR PARTIAL REFLECTION ON A PORTION OF THE FACETS OF THE WAVEGUIDE WORKPIECE 104
112
106
108

120 — CAST A RESIN MATERIAL ON THE FIRST SURFACE OF THE WAVEGUIDE WORKPIECE AND CURE THE RESIN MATERIAL 104
114 116
106
118
108

HYBRID CAST AND MOLD FOR A WAVEGUIDE OPTICAL COMBINER WITH DIMINISHED SINK MARKS AND IMPROVED ASPECT RATIO

BACKGROUND

A waveguide-based optical combiner ("waveguide combiner") with facets or other prism-like structures is an optical conduit designed to manipulate the propagation of light within a medium, often constructed from transparent materials such as glass or plastic. These facets serve multiple purposes, including guiding light waves by controlling the direction and behavior of light, and minimizing optical property losses over the length of the waveguide combiner. Optimizations of the shape, size, and/or angles of the facets are implemented to reduce losses, enhance light confinement, and maintain the intended optical properties throughout the waveguide combiner's length.

Large scale production of waveguide combiners with prism structures employs various fabrication methods, such as laser machining, injection molding, or additive manufacturing, to create prism structures on the waveguide combiner's surface, during the same manufacturing process. These prism structures allow for a controlled manipulation of light for various applications in augmented reality (AR)-based near-eye displays and for providing a view of the real world overlayed with static imagery or video. Some manufacturing processes of plastic waveguide combiners for AR-based near-eye displays involve molding techniques to create structures that guide and project images. However, when design molding is improperly executed or lacks precision, for example, it may lead to deformations in the waveguide combiner's surface. These deformations, which may include inconsistencies, irregularities, or distortions in the molded facets or other structures, impact the image quality projected onto the user's field of view. A reduced image quality arises as these deformations disrupt the intended path of light, causing scattering, refraction, or aberrations that distort or blur the projected images. Addressing these challenges may include refining the design molding process, optimizing mold precision, controlling material properties, and ensuring stringent quality checks throughout manufacturing to minimize deformations and enhance the optical performance of the waveguide combiners for AR applications. However, challenges associated with stresses, sink marks, and the impact of aspect ratio on the quality of the manufactured components of plastic waveguide combiners within the domain of plastic injection molding or polymer processing is further described.

The problem of stresses, such as sink marks, appearing on the backside of plastic waveguide combiners may arise due to the high aspect ratio often demanded by their design. When these waveguide combiners are molded with high aspect ratios, it may lead to uneven cooling during the solidification process. As a result, when the material cools and solidifies, uneven stresses occur within the plastic, resulting in sink marks on the backside of the part. These sink marks coincide with the facets' presence, creating tiny irregularities or depressions on the surface. Further, these imperfections may cause echoes or reflections that disrupt the intended path of light, leading to a decline in the image quality of the waveguide combiner. These sink marks act as small distortions that interfere with the precise transmission and propagation of light within the waveguide combiner, affecting the clarity and fidelity of the projected images, thereby adversely impacting a user's experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate example systems and methods of implementing various fabrication methods including hybrid casting and injection molding and also including a two-part casting method for manufacturing polymer waveguide combiners for AR. Diffractive waveguide combiners use relatively small two-dimensional or three-dimensional features to diffract light to create virtual images. The manufacturing processes of polymer waveguide combiners for AR devices as described herein improves image quality by reducing sink marks originating from facets and holds the potential to minimize undesirable echoes created on the backside of the waveguide workpiece. Sink marks are depressions or imperfections on the surface of an optical element, which may adversely affect the transmission and quality of the projected images. Facets, or the angled surfaces within the waveguide structure, may sometimes introduce sink marks during the manufacturing process, leading to suboptimal image quality characterized by reflections or echoes.

The disclosed systems and methods of implementing a hybrid casting and injection molding waveguide combiner fabrication process is employed to address some issues encountered in the conventional process. In a conventional technique, a coating is applied between two sections of the waveguide combiner, followed by bonding them using an adhesive. Despite attempts to minimize adhesive thickness and align its optical refractive index with that of the plastic part, refractive index mismatch may induce scattering, particularly at facet corners. Consequently, this scattering may result in image artifacts and a decline in the image quality of the AR display. The disclosed systems and methods further include incorporation of a two-part casting method that involves the creation of the waveguide structure in separate sections or parts, which are then combined or assembled to form the complete waveguide. By utilizing this approach, manufacturers may mitigate the occurrence of sink marks caused by facets in the waveguide. This method allows for greater control and precision in the fabrication process, reducing the formation of imperfections or inconsistencies that might degrade image quality. It further minimizes the occurrence of sink marks by dividing the manufacturing process into separate stages, enabling smoother and more uniform surfaces across the waveguide's facets. The reduction of sink marks through the two-part casting method may contribute to enhancing the performance of waveguide combiners, leading to improved optical clarity, reduced reflections, and enhanced image quality in AR displays.

Figure 1:
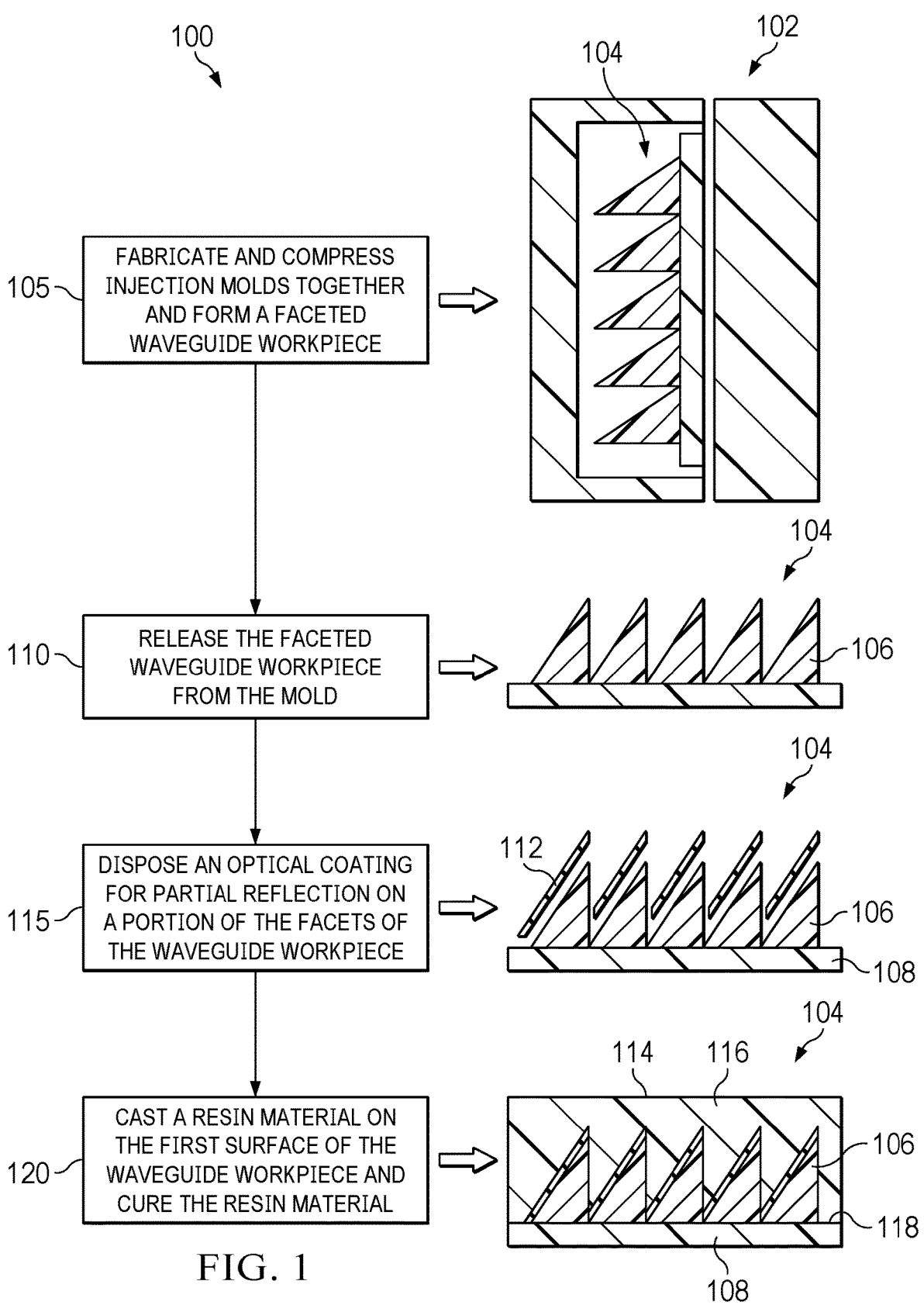
FIG. 1 is a diagram illustrating a hybrid fabrication method of injection molding facets with a polymer resin material to form a waveguide workpiece and casting a resin layer on the surface of the substrate of the waveguide workpiece including the facets to form a waveguide combiner in accordance with some embodiments.

FIG. 1 illustrates a hybrid fabrication method 100 for fabricating a waveguide combiner in accordance with some embodiments. At block 105, an injection molding process is performed to form facets with a polymer resin material and to form a polymer base of a faceted waveguide workpiece. Molds 102 are created and compressed together to form a faceted waveguide workpiece 104 which, at block 110, is released from the molds 102. The faceted waveguide workpiece 104 has one or more facets 106 located at a surface of a base 108. At block 115, a deposition process is performed to coat a thin film layer 112 at a portion of the one or more facets 106 of the faceted waveguide workpiece 104. The thin film layer 112 may include an optical coating that may be a partially reflective coating disposed on one or more facets 106. At block 120, a casting process is performed to coat a first layer 114 of a resin material 116 at the first surface 118 of the transparent body (that is, the base 108 of the waveguide workpiece 104 including the facets 106) and to cure the first layer 114 of the resin material 116.

Several materials may be suitable for use as the optical coating that may serve as a partially or semi-reflective coating on one or more facets 106. Among these materials, dielectric compounds such as titanium dioxide (TiO2), silicon dioxide (SiO2), tantalum oxide (Ta2O5), and hafnium oxide (HfO2) may be utilized. Additionally, metallic coatings involving aluminum (Al) or silver (Ag) may also be employed for their reflective properties. A plurality of optical coatings may be utilized in multiple layers of these materials to achieve reflectivity, durability, and optical performance in a waveguide for AR displays.

Figure 2:
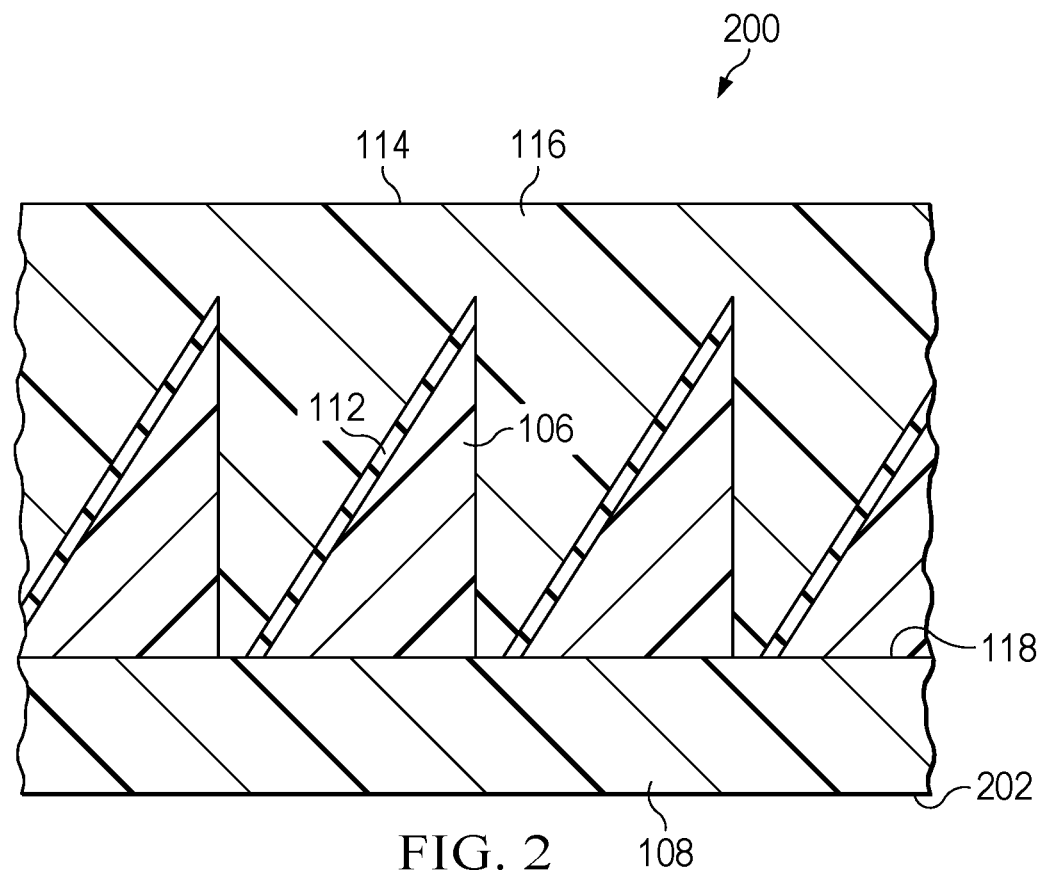
FIG. 2 is a diagram illustrating the waveguide combiner formed from the hybrid fabrication method of FIG. 1 in accordance with some embodiments.

FIG. 2 illustrates an enlarged view of a portion of an example waveguide combiner 200 formed from the hybrid fabrication method of FIG. 1 after the first layer 114 of the resin material 116 is cured; that is, following the process of block 120. The cast resin may be cured via thermal and/or ultraviolet (UV) processes to initiate and accelerate the chemical reaction that transforms the liquid resin into a solid state during polymerization. A transparent body, also referred to as the base 108 includes the first surface 118 and a second surface 202. The transparent body is composed of the polymer material that has the one or more facets 106 extending from the first surface 118 of the transparent body. The first layer 114 of the resin material 116 is cast at the first surface 118 of the transparent body and covers the thin film layer 112. The first layer 114 of the resin material 116 forms a substantially planar surface opposite the first surface 118 of the transparent body. Although not depicted in FIG. 2, a subsequent casting process may be performed to coat a second layer (not shown) of the resin material at the second surface 202 of the transparent body. Likewise, as also not depicted in FIG. 2, a subsequent casting process may be performed to concurrently cast a second layer of the resin material at the second surface of the transparent body and a third layer of the resin material at the first layer of the resin material to form a substantially planar surface.

Figure 3:
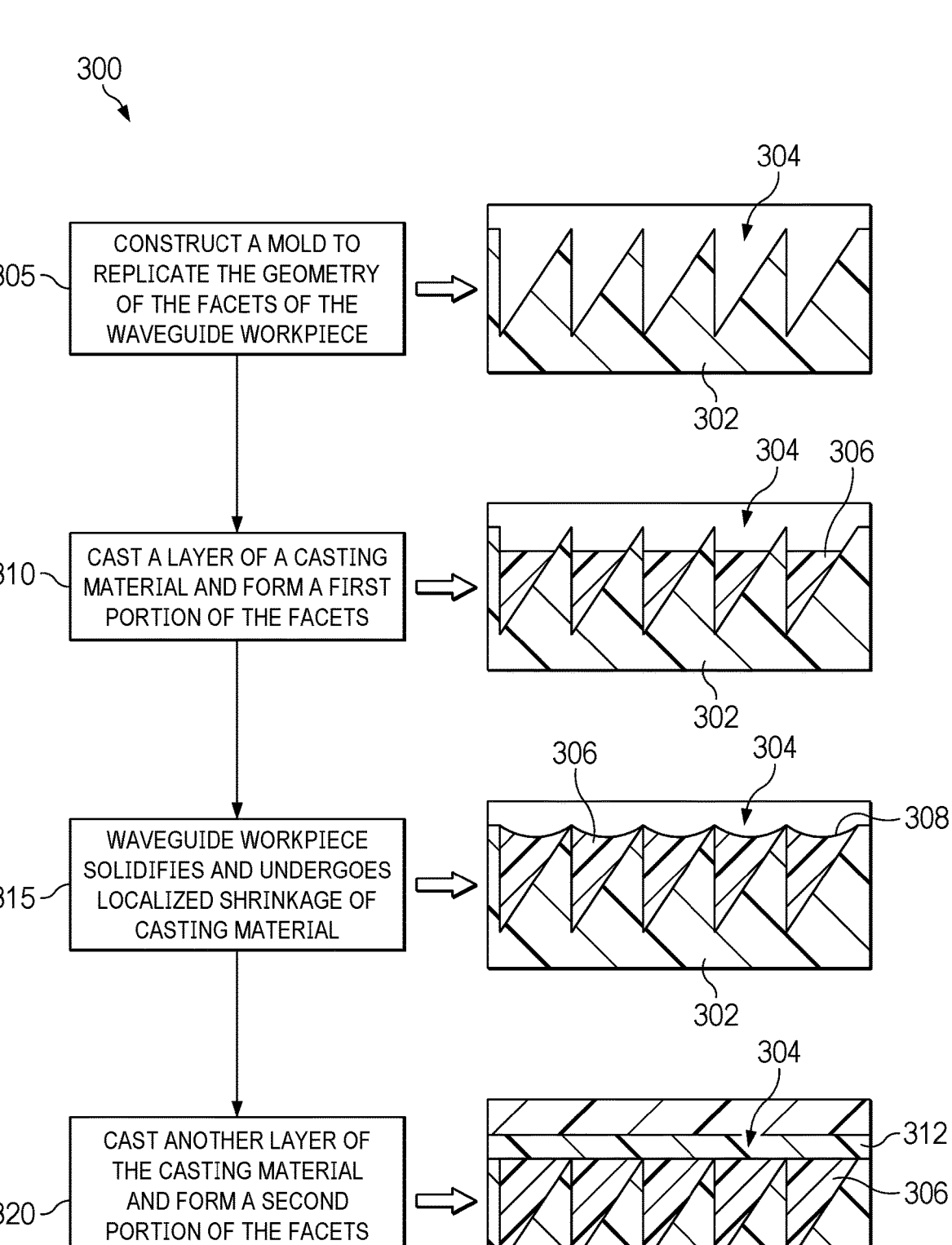
FIGS. 3 and 4 are diagrams that together illustrate a fabrication method of casting two or more partial layers of polymer resin material in a cavity of a mold to form the surface of the substrate of the waveguide workpiece including the facets to form a waveguide combiner in accordance with some embodiments.
Figure 4:
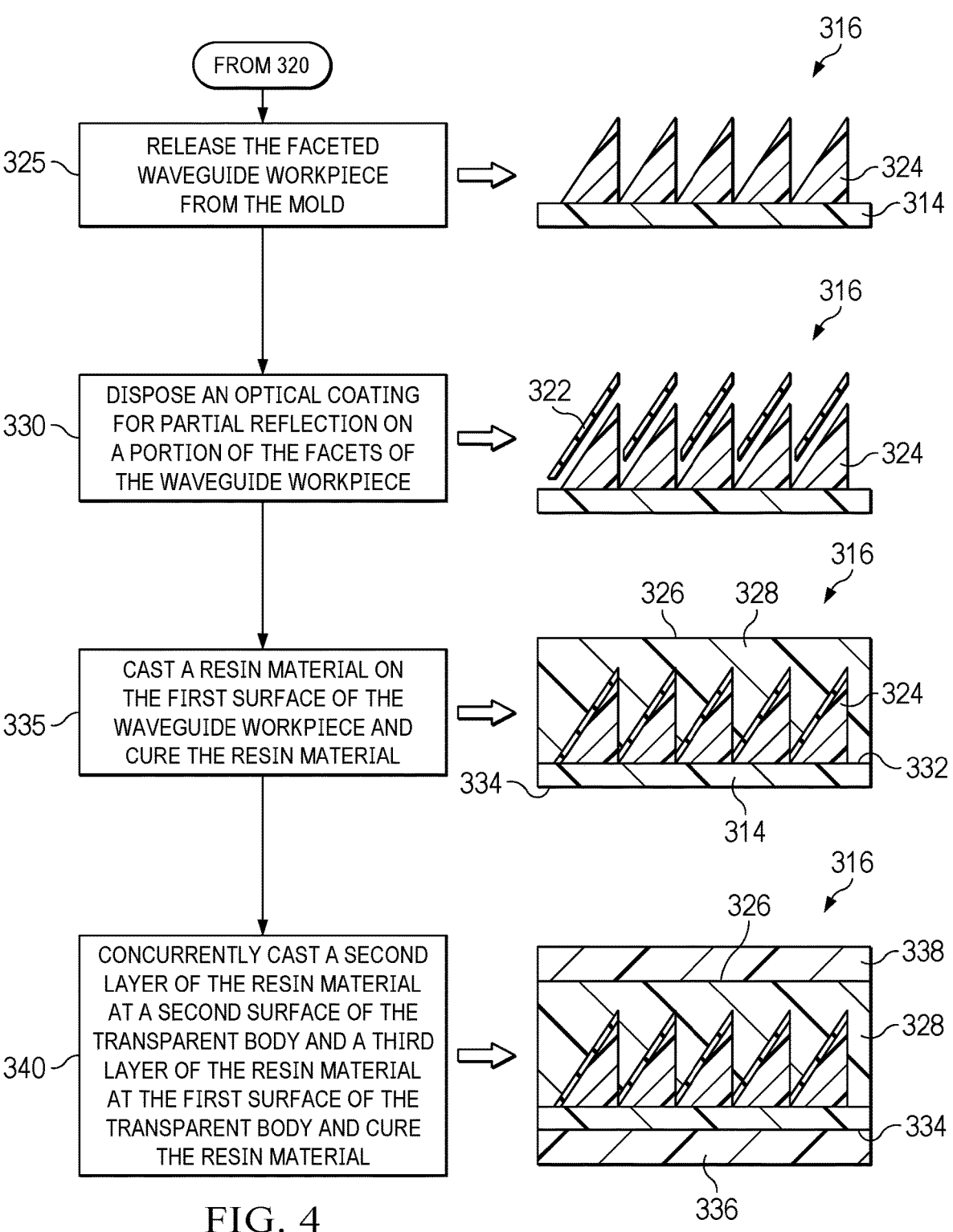

FIGS. 3 and 4 are diagrams that together illustrate a fabrication method 300 of casting two or more partial layers of polymer resin material in a cavity of a mold to form the surface of the substrate of the waveguide workpiece including the facets to form a waveguide combiner. At block 305, a mold is provided to replicate the geometry of the facets of the waveguide workpiece. The mold 302 has one or more cavities 304 configured to form facets. At block 310, a casting process is performed to cast one or more layers of a polymer material, at least partially, into the one or more cavities 304 of the mold 302 to partially form a first portion 306 of the facets of a faceted workpiece. In other words, the one or more cavities 304 are underfilled with the polymer material one or more times. At block 315, the first portion 306 of the partially formed facets of the waveguide workpiece solidify and undergo localized shrinkage of the casting material. As a result of this localized shrinkage, undesirable sink marks 308 may form from the difference in the material quantity of the facets. These marks, often denoted as sink marks 308, result from variations in material quantity across the facets. At block 320, another casting process is performed to fill in the sink marks 308 in an attempt to minimize these sink marks through material uniformity across the facets. A second portion 312 of the polymer material is cast into the one or more cavities 304 of the mold 302 to form the facets and base, also known as a transparent body.

In the casting fabrication process of waveguide combiners, sink marks may emerge due to localized shrinkage. When the material cools and solidifies unevenly within the mold or casting, certain areas might experience differential shrinkage. This discrepancy in the material's volume leads to depressions or imperfections known as sink marks, where the surface appears uneven or depressed due to the unequal contraction of material within the facet regions. Sink marks may adversely impact the optical quality of the waveguide, causing distortions or imperfections in the transmitted images in augmented reality displays.

FIG. 4 illustrates a continuation of the fabrication method 300, in which additional layers of resin material are cast concurrently on a first surface and second surface of the waveguide combiner. Blocks 325, 330, and 335 of FIG. 4 thus are similar in process to the processes of blocks 110, 115, and 120 of FIG. 1, respectively. At block 325, a solidified faceted waveguide workpiece 316 is released from the molds. Faceted waveguide workpiece 316 has one or more facets 324 located at a surface of base 314. At block 330, a deposition process is performed to coat a thin film coating 322 at a portion of the one or more facets 324 of the faceted waveguide workpiece 316. The thin film coating 322 may include an optical coating that may be a partially reflective coating disposed on one or more facets 324. At block 335, a casting process is performed to coat a first layer 326 of a resin material 328 at the first surface 332 of the transparent body (that is, the base 314 of the faceted waveguide workpiece 316 including the facets 324) and to cure the first layer 326 of the resin material 328. A first surface 332 and an opposing second surface 334 of the transparent body are substantially planar after the casting the resin. Facets 324 extend from the first surface 332 of the transparent body. The first layer 326 of the resin material 328 may be cured to form the waveguide combiner. A further casting process (not shown) may be performed to cast a second layer of the resin material 328 at the second surface 334 of the transparent body. At block 340, a casting process is performed to concurrently cast a second layer 336 of the resin material at the second surface 334 of the transparent body and a third layer 338 of the resin material 328 at the first layer of the resin material and to cure the resin material 328. The resin material 328 of the first layer 326, the second layer 336, and the third layer 338 may be the same or differing, optically compatible, material layers.

Figure 5:
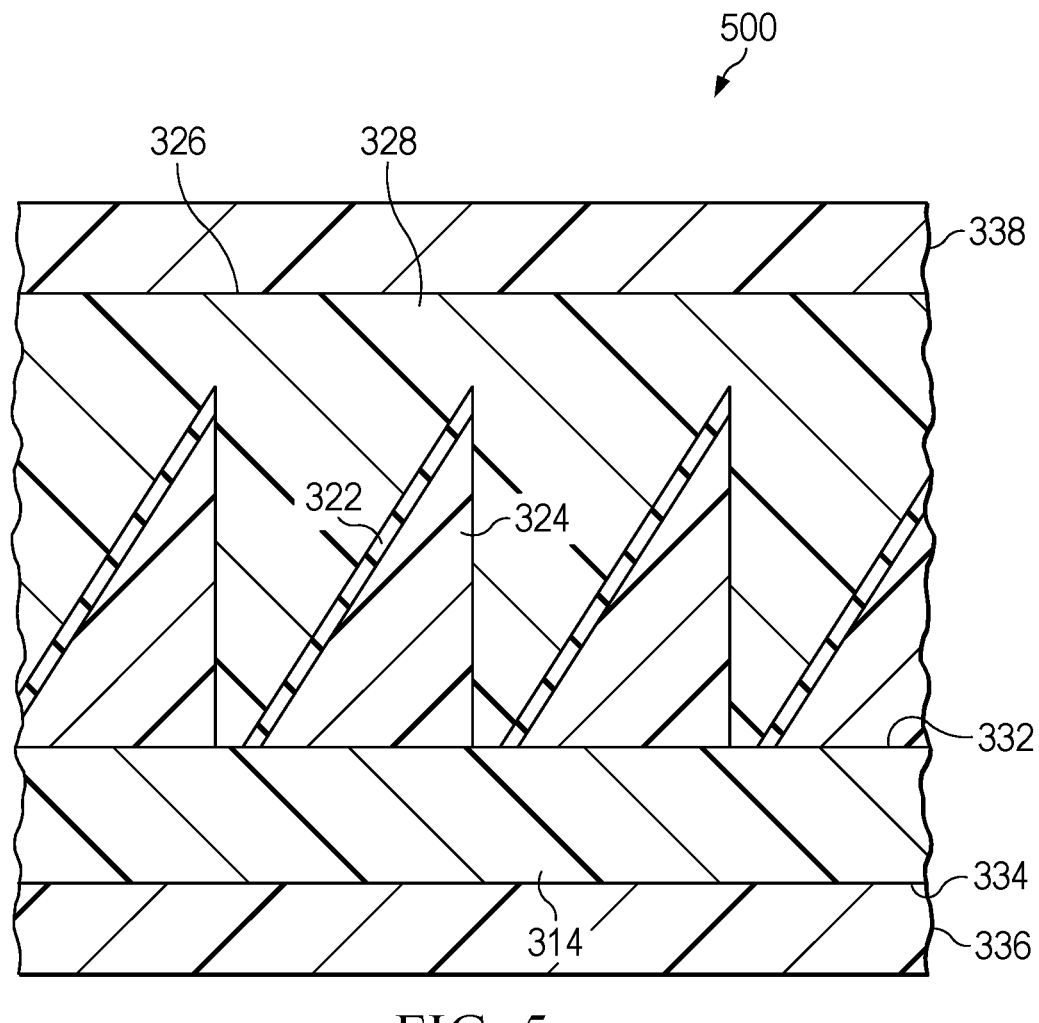
FIG. 5 is a diagram illustrating an example waveguide combiner formed from the fabrication method of FIGS. 3 and 4 in accordance with some embodiments.

FIG. 5 illustrates an enlarged view of a portion of an example waveguide combiner 500 formed from the two-part fabrication method 300 of FIGS. 3 and 4 after the second layer 336 and the third layer 338 of the resin material are cured; that is, following the process of block 340. A transparent body, also referred to as the base 314, includes a first surface 332 and a second surface 334. The transparent body is composed of the polymer material that has the one or more facets 324 extending from the first surface 332 of the transparent body. The first layer 326 of the resin material 328 is cast at the first surface 118 of the transparent body and covers the thin film coating 322. Second layer 336 is disposed at the second surface 334 of the transparent body and a third layer 338 of the resin material at the first layer 326 of the resin material 328. The waveguide combiner 500 comprises one or more optical components such as facets 324 composed of a polymer and at least partially formed via a first casting process. The transparent body or base 314 is formed via a second casting process. The transparent body or base 314 is composed of a polymer and has a first surface 332 and an opposing second working surface 334, wherein the one or more optical components being facets 324 are disposed at a first surface 332 of the transparent body. A first layer 326 of resin material 328 overlays the one or more optical components and the first working surface of the transparent body.

Figure 6:
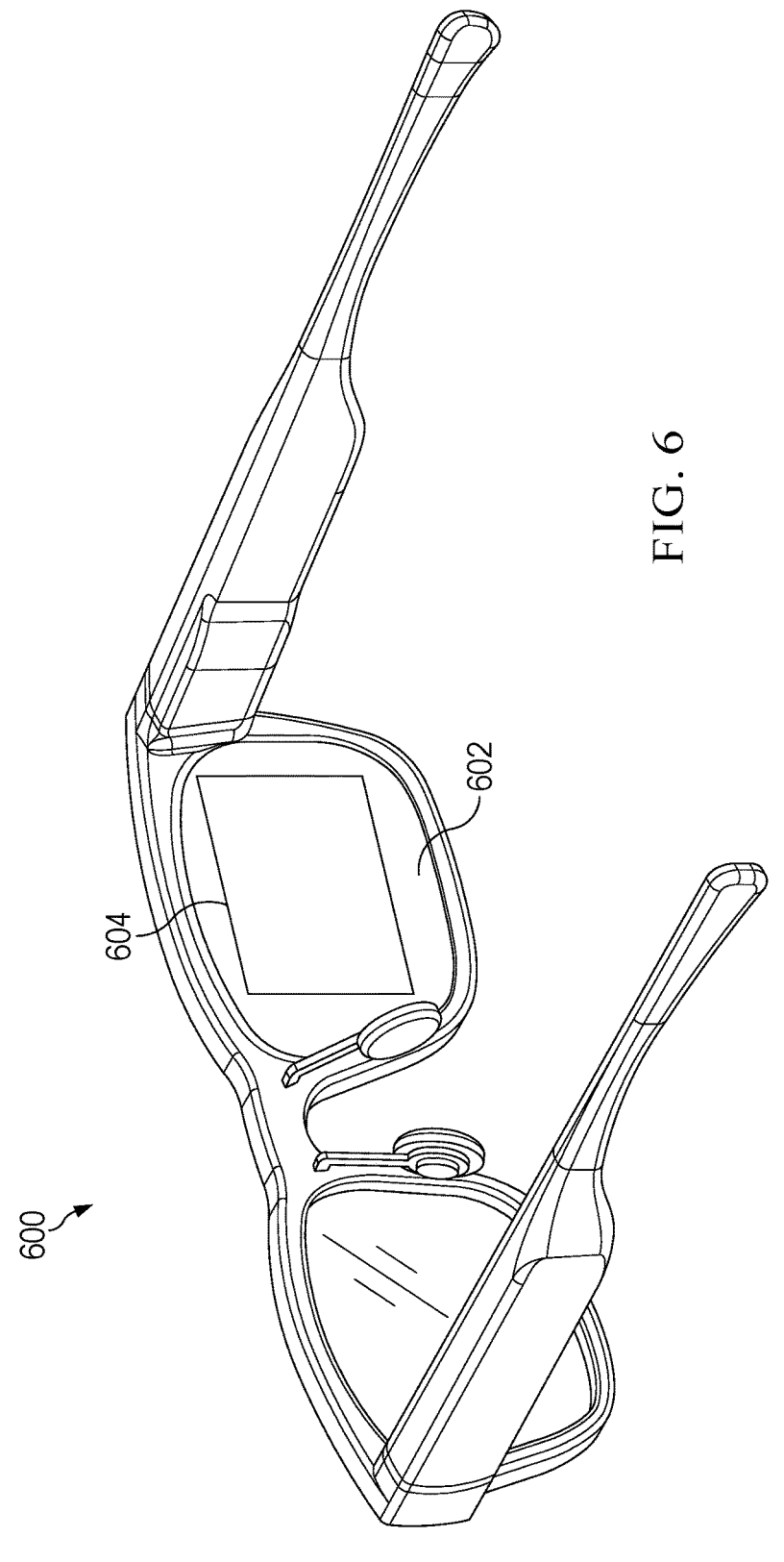
FIG. 6 is a diagram illustrating a rear perspective view of a set of AR glasses with at least one lens employing a waveguide combiner formed via one or more of the processes described in FIGS. 1-5 in accordance with some embodiments.

FIG. 6 illustrates a set of AR glasses implementing a waveguide combiner formed via one or more of the processes described above. As shown, the AR glasses 600 include a set of lenses, including a lens 602 incorporating a waveguide 604. The waveguide 604 may incorporate optical features fabricated in a hybrid mold and cast in as described above, such as for prism-like facets, incoupler, an outcoupler, or some other optical component of the waveguide.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for forming a waveguide combiner comprising:

injecting a polymer material into a mold having one or more cavities mirroring a faceted workpiece;

releasing a resulting solidified faceted workpiece from the mold, wherein the solidified faceted workpiece comprises:

one or more facets composed of the polymer material; and a transparent body with a first surface and a second surface, the transparent body composed of the polymer material, the one or more facets extending from the first surface of the transparent body;

disposing a thin film coating at a portion of the one or more facets of the faceted workpiece;

casting a first layer of a resin material at the first surface of the transparent body and covering the thin film coating; and curing the first layer of the resin material to form the waveguide combiner.

2. The method of claim 1, wherein the resin material is a polymer resin.

3. The method of claim 1, wherein the first layer of the resin material forms a substantially planar surface opposite the first surface of the transparent body.

4. The method of claim 1, further comprising:

casting a second layer of the resin material at the second surface of the transparent body.

5. The method of claim 1, further comprising:

concurrently casting a second layer of the resin material at the second surface of the transparent body and a third layer of the resin material at the first layer of the resin material to form a substantially planar surface.

6. The method of claim 1, wherein the thin film coating comprises a semi-reflective material.

7. A waveguide combiner fabricated according to the method of claim 1.

8. A method for forming a waveguide combiner comprising:

providing a mold having one or more cavities configured to form facets;

casting one or more layers of a polymer material at least partially into the one or more cavities of the mold to partially form portions of facets of a faceted workpiece;

casting one or more layers of the polymer material, after solidification of the portions of the facets of the faceted workpiece, to complete formation of the facets and to form a transparent body of a resulting solidified faceted workpiece;

releasing the solidified faceted workpiece from the mold;

disposing a thin film layer at a portion of one or more of the facets of the solidified faceted workpiece;

casting a first layer of a resin material at a first surface of the transparent body and covering the thin film layer; and curing the first layer of the resin material to form the waveguide combiner.

9. The method of claim 8, wherein the thin film layer comprises a semi-reflective material.

10. The method of claim 8, wherein the resin material is a polymer resin.

11. The method of claim 8, wherein a first surface and an opposing second surface of the transparent body are substantially planar after the casting the resin material and wherein the facets extend from the first surface of the transparent body.

12. The method of claim 8, further comprising:

casting a second layer of the resin material at a second surface of the transparent body.

13. The method of claim 8, further comprising:

concurrently casting a second layer of the resin material at a second surface of the transparent body and a third layer of the resin material at the first layer of the resin material.

14. A waveguide combiner fabricated according to the method of claim 8.

15. An optical component comprising:

a waveguide combiner comprising:

one or more optical components composed of a polymer and at least partially formed via a first casting process;

a transparent body formed via a second casting process, the transparent body composed of a polymer and having a first working surface and an opposing second working surface, wherein the one or more optical components are disposed at a first surface of the transparent body; a thin film layer disposed at least one of the one or more optical components; and a first layer of resin material overlying the one or more optical components and the first working surface of the transparent body.

16. The optical component of claim 15, wherein the thin film layer includes a semi-reflective material.

17. The optical component of claim 15, wherein the resin material is a plastic resin.

18. The optical component of claim 15, further comprising:

a second layer of the resin material is cast at the second working surface of the transparent body.

19. The optical component of claim 15, further comprising:

a second layer of the resin material is concurrently cast at the second working surface of the transparent body with a third layer of the resin material at the first layer of the resin material.

* * * * *